Aug. 4, 1942.      G. P. SCHMITT             2,291,657
           CATALYTIC MATERIAL FOR LIGHTERS
              Filed Jan. 16, 1940
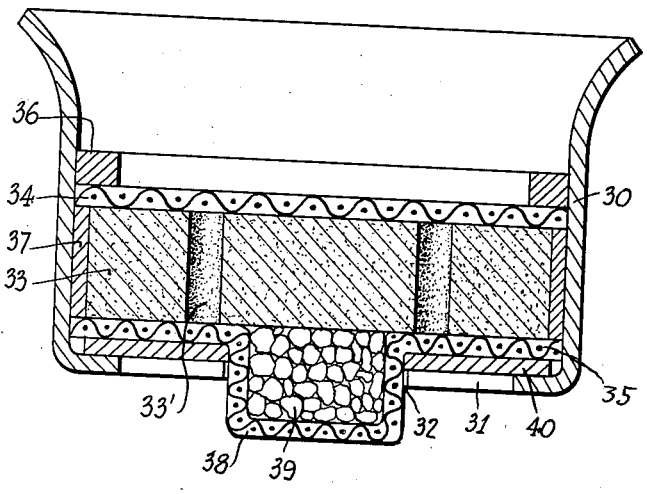
INVENTOR.
GEORGE PHILIP SCHMITT.
BY
                    ATTORNEY.

Patented Aug. 4, 1942

2,291,657

UNITED STATES PATENT OFFICE 2,291,657

CATALYTIC MATERIAL FOR LIGHTERS

George Philip Schmitt, New York, N. Y.

Application January 16, 1940, Serial No. 314,136

5 Claims. (Cl. 67—7)

This invention relates to improvements in catalytic units for lighters of the flameless type wherein a catalyst is employed which becomes incandescent in coaction with a vaporizable fluid, in the presence of air, and is in part a continuation of application Serial Number 100,297, filed September 11, 1936, which matured into Patent No. 2,186,995, dated January 16, 1940.

It is an object of the present invention to provide a catalytic unit for a lighter in which the catalyst is made up of one or more parts so arranged and constructed as to offer effective and efficient means for the passage of the mixed vaporizable fluid and air to readily reach the catalyst body for rapid incandesence thereof.

It is a further object of the present invention to provide a catalyst unit for a flameless lighter in which the catalyst includes a plurality of granules located below the main catalyst element for the purpose of preheating the vaporizable fuel or fuel vapor in its passage from the fuel reservoir to the said main catalyst element.

These and other objects and advantages are obtained and attained by the novel construction, design and arrangement of elements, as hereinafter described and illustrated in the accompanying drawing, constituting a feature of this disclosure, and in which the figure is a sectional view of a catalyst unit embodying the invention.

The drawing discloses a mode of preheating the fuel vapor before it reaches the main catalyst element. In this drawing the main catalyst element is indicated by the numeral 33 over which is disposed the metal screen or perforated shield 34. A metal cup or holder 30 houses the catalyst pill or pellet 33 preferably comprising platinum sponge or platinum black composition. Cup 30 has a bottom 31 provided with the opening 32. The bottom screen 35 upon which the catalyst 33 is seated has a pocket 38 extending through the bottom opening 32. Within this pocket are placed a plurality of granules or globules 39 of catalytic material. The retainer ring 36 holds the top screen 34, pellet 33, spacing ring 37, washer 40 and bottom screen 35 intimately together. The pellet 33 may be provided with the perforations 33'. Between the bottom 32 of the holder 30 and the flat portion of bottom screen 35 is placed the washer or false bottom 40 which has the opening 32 through which the pocket 38 of bottom screen 35 projects. This plate 40 facilitates in the support of the bottom screen 35.

As a cigarette (not shown) is applied to the retainer ring 36 and drawn upon, the vaporized fuel and air mixture in the lighter coming from the fuel reservoir (not shown) under the catalyst unit will first cause incandesence of the granules 39 below the main catalyst element 33 and preheat the fuel vapor in its passage to the main catalyst elements.

What is claimed as new and desired to be secured by Letters Patent is:

1. A catalyst unit for a lighter of the flameless type comprising a holder having an opening in its bottom, a solid block of catalytic material within said holder, and catalytic material in granular form below said solid block of catalytic material.

2. A catalyst unit for a lighter of the flameless type comprising a holder having an opening in its bottom, a solid block of catalytic material within said holder, a screen below said material and having a pocket, and granular catalytic material within said pocket.

3. A catalyst unit for a lighter of the flameless type comprising a holder having an opening in its bottom, a solid block of catalytic material within said holder, an element below said material and having a perforated pocket, and granular catalytic material within said pocket.

4. A catalyst unit for a lighter of the flameless type comprising a holder having an opening in its bottom, a solid block of catalytic material within said holder, a screen above said material, a screen below said material, said latter screen having a pocket extending through the opening of the holder's bottom, granular catalytic material within said pocket, a retainer above said first mentioned screen, and a perforated plate below said latter mentioned screen and seated on the bottom of said holder.

5. A catalyst unit for a lighter of the flameless type comprising a holder having an opening in its bottom, a solid block of catalytic material within said holder, an annulus between said material and the inner wall of said holder, a screen above said material, a screen below said material, said latter mentioned screen having a pocket extending through the opening of the holder's bottom, granuar catalytic material within said pocket, a retainer ring above said first mentioned screen, and a perforated plate below said latter mentioned screen and seated on the bottom of said holder.

GEORGE PHILIP SCHMITT.